United States Patent
Huang et al.

(10) Patent No.: US 9,748,793 B2
(45) Date of Patent: Aug. 29, 2017

(54) POWER INPUT CIRCUITS

(71) Applicant: Quanta Computer Inc., Taoyuan (TW)

(72) Inventors: Chi-Jui Huang, Taoyuan (TW);
Tsung-Ta Chen, Taoyuan (TW);
Tien-Lung Hsieh, Taoyuan (TW);
Jyun-Ching Luo, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 288 days.

(21) Appl. No.: 14/804,457

(22) Filed: Jul. 21, 2015

(65) Prior Publication Data

US 2016/0218521 A1    Jul. 28, 2016

(30) Foreign Application Priority Data

Jan. 23, 2015   (TW) .............. 104102205 A (51) Int. Cl.
*H02J 7/02* (2016.01)
*H02J 7/00* (2006.01)
*H02J 50/10* (2016.01)

(52) U.S. Cl.
CPC ............ *H02J 7/025* (2013.01); *H02J 7/0055* (2013.01); *H02J 7/0068* (2013.01); *H02J 50/10* (2016.02); *H02J 7/02* (2013.01)

(58) Field of Classification Search
CPC ......... H01F 38/14; H02J 5/005; H02J 7/0052; H02J 7/0068; H02J 7/025; H02J 17/00; H02J 50/10; H02J 50/12; H02J 2007/0059; H04B 5/0037; H04B 5/0075; H04B 5/0093
USPC ...................................................... 307/104
See application file for complete search history.

(56) References Cited

U.S. PATENT DOCUMENTS

| 5,383,912 A | 1/1995 | Cox et al. | |
|---|---|---|---|
| 8,232,762 B2 * | 7/2012 | Yun ............. | H02J 7/0068 320/103 |
| 2004/0263123 A1 * | 12/2004 | Breen ........... | H02J 7/0022 320/128 |

(Continued)

FOREIGN PATENT DOCUMENTS

CN        102738869        10/2012

OTHER PUBLICATIONS

Chinese language office action dated Mar. 3, 2016, issued in application No. TW 104102205.

*Primary Examiner* — Levi Gannon
(74) *Attorney, Agent, or Firm* — McClure, Qualey & Rodack, LLP (57) ABSTRACT

A power input circuit. A wireless power receiver receives power from a wireless power transmitter. A charging circuit is coupled to the battery. A first switch is controlled by a first control signal. A second switch is controlled by the first control signal. A third switch is coupled between the battery and the voltage input terminal and controlled by a second control signal. A fourth switch is coupled between the voltage input terminal and the charging circuit and controlled by a third control signal. A fifth switch is coupled between the wireless power receiver and the charging circuit and controlled by a fourth control signal. When the wireless power receiver receives power, the third switch and the fifth switch are closed to transmit the received power to the charging circuit for charging the battery, and the computer device is powered by the battery.

10 Claims, 6 Drawing Sheets

(56) References Cited

U.S. PATENT DOCUMENTS

| | | | |
|---|---|---|---|
| 2007/0262651 A1* | 11/2007 | Odaohara | G06F 1/30 307/66 |
| 2007/0279004 A1* | 12/2007 | Wang | H02J 7/0019 320/128 |
| 2011/0307732 A1* | 12/2011 | Furusho | H02J 7/0068 713/340 |
| 2013/0257360 A1* | 10/2013 | Singh | H01F 38/14 320/108 |
| 2014/0176076 A1* | 6/2014 | Momo | H01M 10/46 320/128 |
| 2016/0126777 A1* | 5/2016 | Tsai | H02J 50/27 320/108 |

* cited by examiner

POWER INPUT CIRCUITS

CROSS REFERENCE TO RELATED APPLICATIONS

This Application claims priority of Taiwan Patent Application No. 104102205, filed on Jan. 23, 2015, the entirety of which is incorporated by reference herein.

BACKGROUND OF THE INVENTION

Field of the Invention

The invention relates to a power input circuit, and more particularly to a power input circuit capable of supporting the stable functioning of the overall system.

Description of the Related Art

Portable electronic devices are usually required to have a fast response and high performance, and they are required to be light, thin, and small in size. In addition, such portable electronic devices usually have a rechargeable battery to provide power. When the remaining battery power is low, the battery can be charged via a wired or wireless charger.

Although wireless charging technology has been under development for a while, its application is still limited in low power levels. For example, the current wireless charging technology usually provides 5 Watts of power for the mobile application. Even the Alliance for Wireless (A4WP) announced that for wireless charging products in 2014, which are capable of providing 20 Watts of output power for charging tablet computers or notebooks via magnetic resonance, the output power is still not high enough for the notebooks to support the normal operation of the computer system and also charge the battery at the same time. Generally, the power required for supporting normal operation of the computer system while also charging the battery at the same time is at least 60 Watts.

Therefore, a novel power input circuit to solve the above problems is required.

BRIEF SUMMARY OF THE INVENTION

Power input circuits are provided. An exemplary embodiment of a power input circuit comprises a wireless power receiver, a battery, a charging circuit, a first switch, a second switch, a third switch, a fourth switch and a fifth switch. The wireless power receiver receives power from a wireless power transmitter. The charging circuit is coupled to the battery. The first switch is controlled by a first control signal. The second switch is coupled between the first switch and a voltage input terminal of a computer device, and is controlled by the first control signal. The third switch is coupled between the battery and the voltage input terminal and is controlled by a second control signal. The fourth switch is coupled between the voltage input terminal and the charging circuit, and is controlled by a third control signal. The fifth switch is coupled between the wireless power receiver and the charging circuit, and is controlled by a fourth control signal. When the wireless power receiver receives the power, the third switch and the fifth switch are closed to transmit the received power to the charging circuit for charging the battery, and the computer device is powered by the battery.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

There are several methods of wireless power transmission, of which magnetic induction and magnetic resonance are two of the most common. Magnetic induction basically adopts an induction coil at both the wireless power transmitter and the wireless power receiver. When power is provided to the transmitter coil, the electromagnetic effect is generated since the current generates the magnetism and the magnetism generates the current. When the receiver coil receives the electromagnetic signal, power is generated via the magnetic field change so as to charge the battery. The principle of magnetic resonance is different from magnetic induction that uses mutual induction to exchange electromagnetic power. For magnetic resonance, the charger dock and the object to be charged use the same frequency so that the power can be efficiently transmitted therebetween by resonance. When the wireless power transmitter and the wireless power receiver resonate at the same frequency, the wireless power receiver receives the electromagnetic field generated by the wireless power transmitter, thereby receiving the power from the wireless power transmitter.

Generally, the wireless power receiver passes its power requirement to the wireless power transmitter so as to achieve the coordination of supply and demand. However, the system power loading of a notebook is not a constant value and will dynamically change according to operation by the user. For this case, when the notebook is only powered by a wireless charger, the response speed for adjusting the power supplied to the notebook cannot follow the dynamic power-requirement changes, which may cause the notebook to crash.

To solve this problem, a novel power input circuit is provided so that the wireless charger product can be applied not only to charge the battery in the computer device, but it can also be applied in scenarios wherein the computer device functions normally and when the power adapter, the wireless charger, and the battery co-exist.

Figure 1:
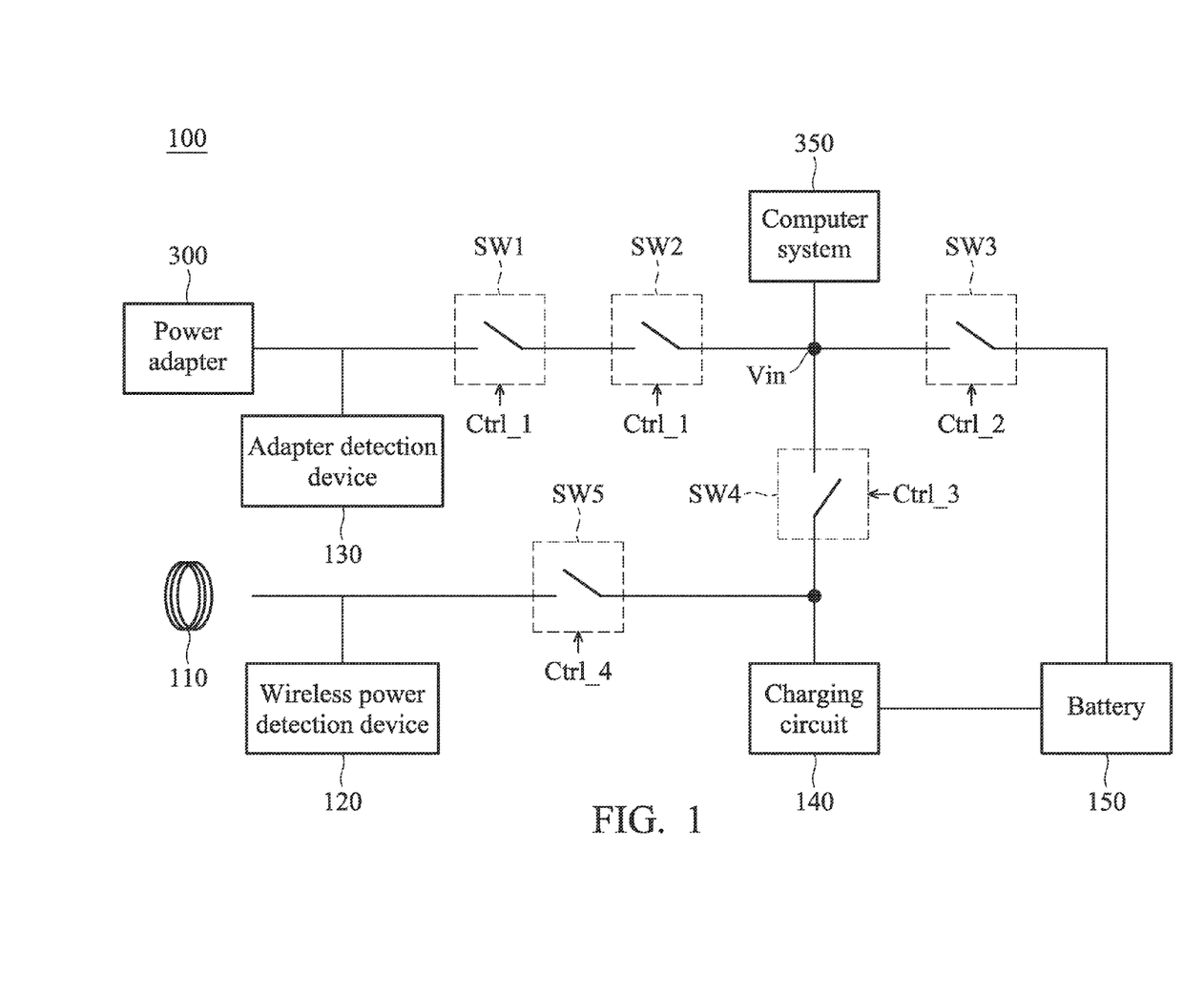
FIG. 1 is a circuit diagram of a power input circuit according to an embodiment of the invention.

FIG. 1 is a circuit diagram of a power input circuit according to an embodiment of the invention. In an embodiment of the invention, the power input circuit 100 may be the power input circuit coupled to or comprised in a computer device for receiving power from a power adapter 300 or a wireless power source in a wired or wireless manner, and may provide the received power to the computer system 350 and the battery of the computer device, or provide the power stored in the battery to the computer system 350 of the computer device. The computer device may be a portable electronic device, such as a notebook, a tablet, a mobile phone, or others. The power input circuit 100 may comprise a wireless power receiver 110, such as the receiving coil shown in FIG. 1, a wireless power detection device 120, an adapter detection device 130, a charging circuit 140, a battery 150 and a plurality of switches SW1~SW5. The wireless power receiver 110 receives power from a wireless power transmitter. The wireless power detection device 120 is coupled to the wireless power receiver 110 for detecting whether the wireless power receiver 110 receives power and generates a detection signal Wireless_in according to the detection result. The adapter detection device 130 detects whether the power adapter 300 is coupled to the computer device, for example, whether the power adapter 300 is plugged into a socket of the computer device, and generates the detection signal Adapter_in according to the detection result. The charging circuit 140 is coupled to the battery 150 to charge the battery 150 according to the received power.

According to an embodiment of the invention, the switches SW1~SW5 are respectively controlled by different control signals Ctrl_1~Ctrl_4 for changing the states (that is, open or closed) of the switches SW1~SW5 according to different input power scenarios. In this manner, an optimum power source can be chosen to provide stable power to the computer system 350 to solve the problem mentioned above. As shown in the figure, the switch SW1 is coupled between the adapter detection device 130 and the switch SW2 and is controlled by the control signal Ctrl_1. The switch SW2 is coupled between the switch SW1 and a voltage input terminal Vin of the computer device and is controlled by the control signal Ctrl_1. The switch SW3 is coupled between the battery 150 and the voltage input terminal Vin and is controlled by the control signal Ctrl_2. The switch SW4 is coupled between the voltage input terminal Vin and the charging circuit 140 and is controlled by the control signal Ctrl_3. The switch SW5 is coupled between the wireless power receiver 110 and the charging circuit 140 and is controlled by the control signal Ctrl_4.

According to an embodiment of the invention, when the switch is opened in response to the corresponding control signal, the two terminals that the switch is coupled to are disconnected. That is, an open circuit is formed. When the switch is closed in response to the corresponding control signal, the two terminals that the switch is coupled to are connected together to form a closed circuit. Table 1 shows the open or closed states of each switch in different input power scenarios according to an embodiment of the invention.

TABLE 1 the states of the switches in different input power scenarios

| Input power scenario | SW1 | SW2 | SW3 | SW4 | SW5 |
| --- | --- | --- | --- | --- | --- |
| Not receiving any external power | Opened | Opened | Closed | Closed | Opened |
| Only the power adapter is plugged in | Closed | Closed | Opened | Closed | Opened |
| Only the wireless power receiver receives power | Opened | Opened | Closed | Opened | Closed |
| The power adapter is plugged in and the wireless power receiver receives power | Closed | Closed | Opened | Closed | Opened |

According to an embodiment of the invention, the switches SW1~SW5 can be implemented by any component that can be opened or closed in response to the corresponding control signals. For example, in an embodiment of the invention, the switches SW1~SW5 can be respectively implemented by transistors, and each transistor comprises a control electrode receiving the corresponding control signal.

Figure 2:
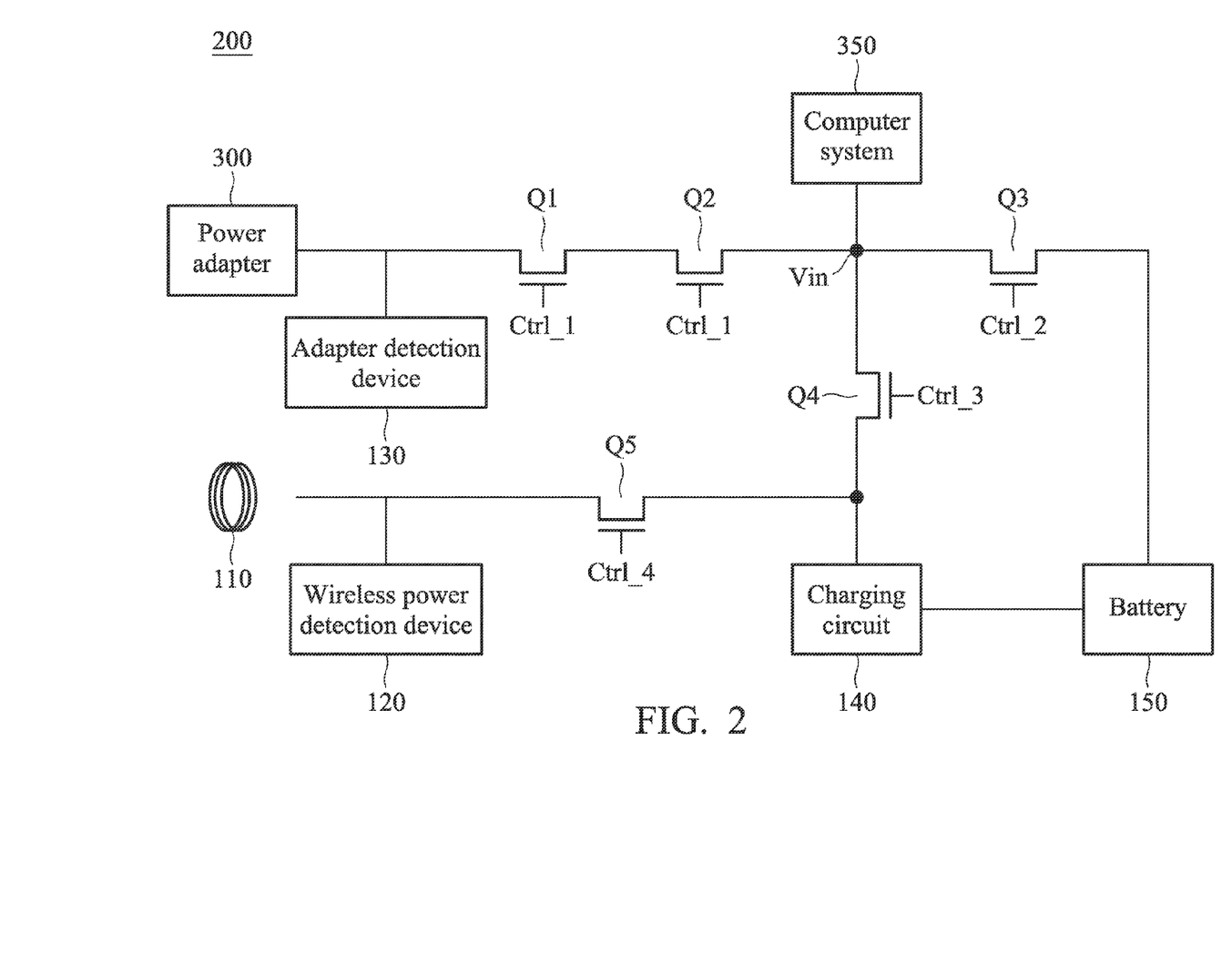
FIG. 2 is a circuit diagram of a power input circuit according to another embodiment of the invention.

FIG. 2 is a circuit diagram of a power input circuit according to another embodiment of the invention. The power input circuit 200 may be the power input circuit coupled to or comprised in a computer device for receiving power from a power adapter 300 or a wireless power source in a wired or wireless manner, and may provide the received power to the computer system 350 and the battery of the computer device, or it may provide the power stored in the battery to the computer system 350 of the computer device. The computer device may be a portable electronic device, such as a notebook, a tablet, a mobile phone, or others. The power input circuit 200 may comprise a wireless power receiver 110, such as the receiving coil shown in FIG. 2, a wireless power detection device 120, an adapter detection device 130, a charging circuit 140, a battery 150 and a plurality of transistors Q1~Q5. The wireless power receiver 110 receives power from a wireless power transmitter. The wireless power detection device 120 is coupled to the wireless power receiver 110 for detecting whether the wireless power receiver 110 receives power and generates a detection signal Wireless_in according to the detection result. The adapter detection device 130 detects whether the power adapter 300 is coupled to the computer device, for example, whether the power adapter 300 is plugged into a socket of the computer device, and generates the detection signal Adapter_in according to the detection result. The charging circuit 140 is coupled to the battery 150 to charge the battery 150 according to the received power.

The transistors Q1~Q5 are respectively controlled by different control signals Ctrl_1~Ctrl_4 for changing the states (that is, on or off) of the transistors Q1~Q5 according to different input power scenarios. In this manner, an optimum power source can be chosen to provide stable power to the computer system 350 to solve the problem mentioned above. As shown in the figure, the transistor Q1 is coupled between the adapter detection device 130 and the transistor Q2 and is controlled by the control signal Ctrl_1. The transistor Q2 is coupled between the transistor Q1 and a voltage input terminal Vin of the computer device and is controlled by the control signal Ctrl_1. The transistor Q3 is coupled between the battery 150 and the voltage input terminal Vin and is controlled by the control signal Ctrl_2. The transistor Q4 is coupled between the voltage input terminal Vin and the charging circuit 140 and is controlled by the control signal Ctrl_3. The transistor Q5 is coupled between the wireless power receiver 110 and the charging circuit 140 and is controlled by the control signal Ctrl_4.

According to an embodiment of the invention, when the transistor is turned on in response to the corresponding control signal, the two terminals that the transistor is coupled to are connected together to form a closed circuit. When the transistor is turned off in response to the corresponding control signal, the two terminals that the switch is coupled to are disconnected. That is, an open circuit is formed. Table 2 shows the on or off states of each transistor in different input power scenarios according to an embodiment of the invention.

TABLE 2 the states of the transistors in different input power scenarios

| Input power scenario | Q1 | Q2 | Q3 | Q4 | Q5 |
|---|---|---|---|---|---|
| Not receiving any external power | Off | Off | On | On | Off |
| Only the power adapter is plugged in | On | On | Off | On | Off |
| Only the wireless power receiver receives power | Off | Off | On | Off | On |
| The power adapter is plugged in and the wireless power receiver receives power | On | On | Off | On | Off |

Note that in the embodiment of the invention, the types (for example, N type or P type) of transistors Q1~Q5 are flexible and can be chosen according to system requirements. For example, the types of transistors Q1~Q5 can be chosen according to the design logics of signal voltage.

Figure 3:
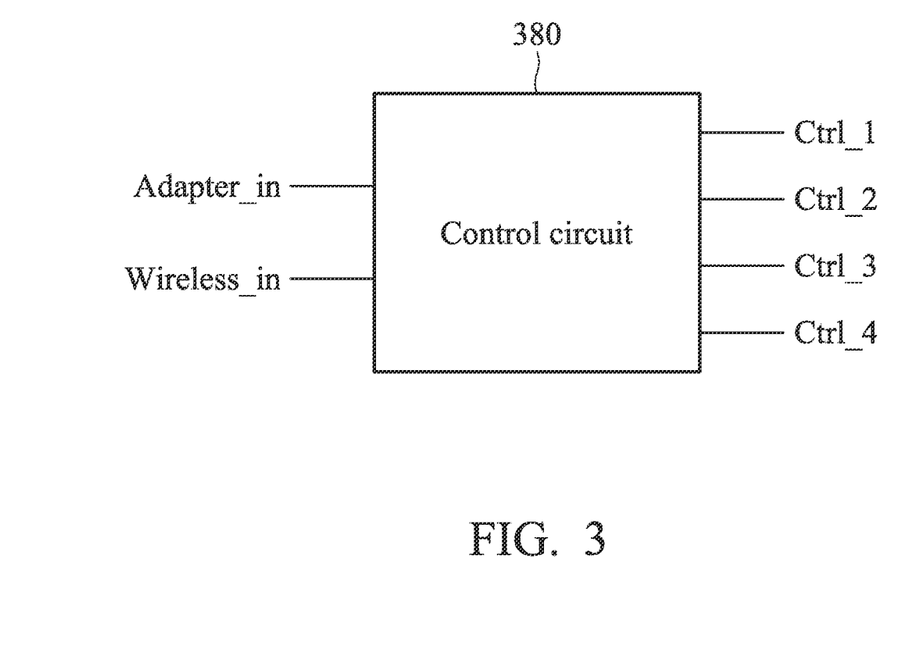
FIG. 3 shows a schematic diagram of a control circuit according to an embodiment of the invention.

FIG. 3 shows a schematic diagram of a control circuit according to an embodiment of the invention. According to an embodiment of the invention, the power input circuit 100/200 may further comprise a control circuit, such as the control circuit 380 as shown in FIG. 3, for receiving the detection signals Adapter_in and Wireless_in, and generating the control signals Ctrl_1~Ctrl_4 according to the input power scenarios indicated by the detection signals Adapter_in and Wireless_in, as the control logic shown in table 1 or table 2, for controlling the switches, transistors, or any other components that can change its open/close or on/off states in response to the control signals.

In addition, in the embodiments of the invention, besides implementing the control circuit by hardware devices, the control signals Ctrl_1~Ctrl_4 may also be generated by designing the software according to the input power scenarios indicated by the detection signals Adapter_in and Wireless_in as the control logic shown in table 1 or table 2. For example, the computer device may comprise an embedded controller receiving the detection signals Adapter_in and Wireless_in and generating the control signals Ctrl_1~Ctrl_4 according to the control logic shown in table 1 or table 2. Therefore, the invention should not be limited to any specific implementation method.

The controlling logics of the switches or transistors under each input power scenario are illustrated further in the following paragraphs.

According to an embodiment of the invention, when the power input circuit 100/200 does not receive any external power (that is, when the adapter detection device 130 does not detect any power adapter 300 being coupled to the computer device and the wireless power detection device 120 does not detect that the wireless power receiver receives any power), the switches SW1, SW2 and SW5 are opened in response to the control signals Ctrl_1 and Ctrl_4, or the transistors Q1, Q2 and Q5 are turned off in response to the control signals Ctrl_1 and Ctrl_4. Meanwhile, the switches SW3 and SW4 are closed in response to the control signals Ctrl_2 and Ctrl_3, or the transistors Q3 and Q4 are turned on in response to the control signals Ctrl_2 and Ctrl_3. In this manner, when the power input circuit 100/200 does not receive any external power, the computer device is powered by the battery 150.

Figure 4:
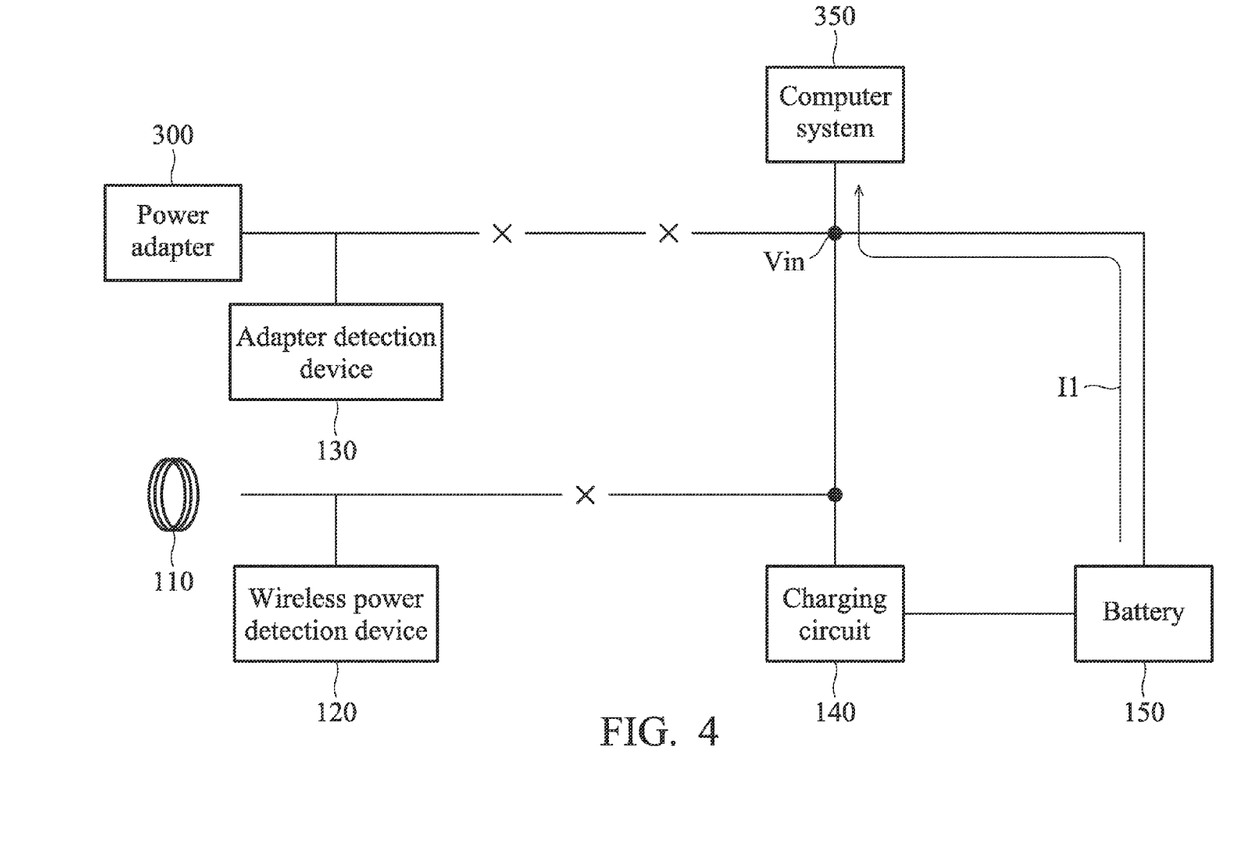
FIG. 4 shows an equivalent circuit diagram of the power input circuit when the power input circuit does not receive any external power according to an embodiment of the invention.

FIG. 4 shows an equivalent circuit diagram of the power input circuit when the power input circuit does not receive any external power according to an embodiment of the invention. As shown in FIG. 4, when the power input circuit 100/200 does not receive any external power, the computer device is powered by the battery 150 under the control of the control signals Ctrl_1~Ctrl_4. Therefore, the current I1 flows from the battery 150 to the computer system 350.

According to another embodiment of the invention, when the power input circuit 100/200 detects that only the power adapter is plugged in (that is, when the adapter detection device 130 detects that the power adapter 300 is coupled to the computer device), the switches SW1, SW2 and SW4 are closed in response to the control signals Ctrl_1 and Ctrl_3 or the transistors Q1, Q2 and Q4 are turned on in response to the control signals Ctrl_1 and Ctrl_3, and the switches SW3 and SW5 are opened in response to the control signals Ctrl_2 and Ctrl_4 or the transistors Q3 and Q5 are turned off in response to the control signals Ctrl_2 and Ctrl_4. In this manner, when the power input circuit 100/200 detects that only the power adapter 300 is plugged in, the power received from the power adapter 300 is provided to the charging circuit 140 to charge the battery 150, and the power received from the power adapter 300 is also provided to the computer device. That is, the computer device is powered by the power adapter 300.

Figure 5:
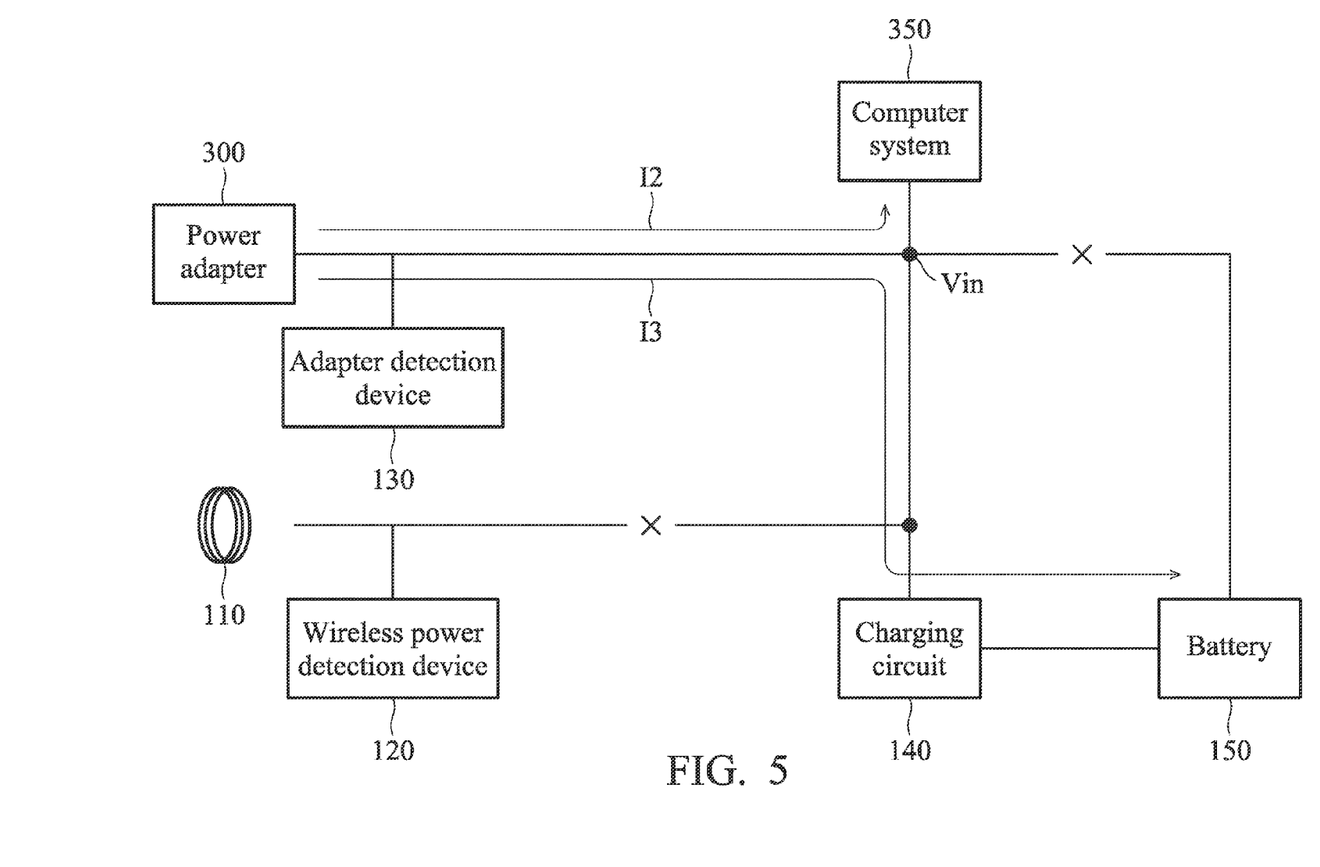
FIG. 5 shows an equivalent circuit diagram of the power input circuit when the power input circuit detects that only the power adapter is plugged in according to an embodiment of the invention.

FIG. 5 shows an equivalent circuit diagram of the power input circuit when the power input circuit detects that only the power adapter is plugged in according to an embodiment of the invention. As shown in FIG. 5, when the power input circuit 100/200 detects that the power adapter is the only power source, under the control of the control signals Ctrl_1~Ctrl_4, the power received from the power adapter 300 is provided to the computer device as the flow of current I2 shown in FIG. 5, and the power received from the power adapter 300 is also provided to the charging circuit 140 to charge the battery 150 as the flow of current I3 shown in FIG. 5.

According to another embodiment of the invention, when the power input circuit 100/200 only detects that the wireless power receiver 110 receives the power (that is, the adapter detection device 130 does not detect that the power adapter 300 is coupled to the computer device but the wireless power detection device 120 detects that the wireless power receiver receives power), the switches SW1, SW2 and SW4 are opened in response to the control signals Ctrl_1 and Ctrl_3 or the transistors Q1, Q2 and Q4 are turned off in response to the control signals Ctrl_1 and Ctrl_3, and the switches SW3 and SW5 are closed in response to the control signals Ctrl_2 and Ctrl_4 or the transistors Q3 and Q5 are turned on in response to the control signals Ctrl_2 and Ctrl_4. In this manner, when the wireless power receiver 110 receives the power, the power received by the wireless power receiver 110 can be provided to the charging circuit 140 to charge the battery 150, and the computer system is powered by the battery 150.

Figure 6:
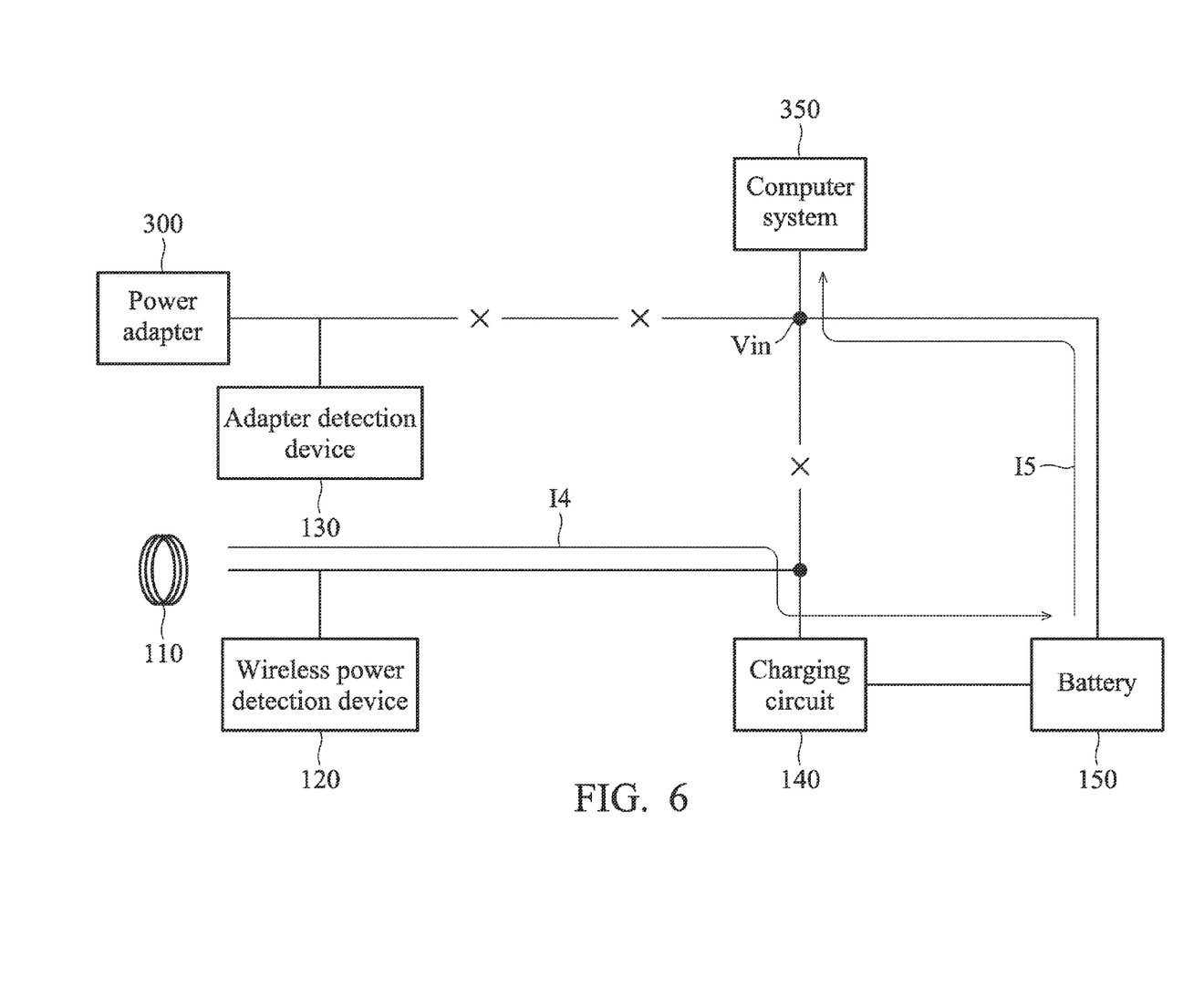
FIG. 6 shows an equivalent circuit diagram of the power input circuit when the power input circuit detects that only the wireless power receiver 110 receives the power according to an embodiment of the invention.

FIG. 6 shows an equivalent circuit diagram of the power input circuit when the power input circuit detects that only the wireless power receiver 110 receives the power according to an embodiment of the invention. As shown in FIG. 6, when the power input circuit 100/200 detects that only the wireless power receiver 110 receives the power, the power received by the wireless power receiver 110 can be provided to the charging circuit 140 to charge the battery 150 as the flow of current I4 to charge the battery 150, and the computer device is powered by the battery 150 as the flow of current I5.

Note that in the embodiment of the invention, stable power can be provided to the computer device via the large capacitor of the battery 150. In addition, the battery 150 can be charged by the power received by the wireless power receiver 110. In this manner, even in cases where only the wireless power receiver 110 receives power, stable power can also be provided to the computer device. In addition, the disadvantage of slow response to changes in the loading of the computer system can be overcome. Therefore, the computer can operate stably no matter whether the loading is heavy or light.

According to another embodiment of the invention, when the power input circuit 100/200 detects that the power adapter 300 is plugged in and the wireless power receiver 110 receives power at the same time, (that is, the adapter detection device 130 detects that the power adapter 300 is coupled to the computer device and the wireless power detection device 120 detects that the wireless power receiver 110 receives power at the same time), the switches SW1, SW2 and SW4 are closed in response to the control signals Ctrl_1 and Ctrl_3, or the transistors Q1, Q2 and Q4 are turned on in response to the control signals Ctrl_1 and Ctrl_3, and the switches SW3 and SW5 are opened in response to the control signals Ctrl_2 and Ctrl_4 or the transistors Q3 and Q5 are turned off in response to the control signals Ctrl2 and Ctrl_4. In this manner, the power received from the power adapter 300 can be provided to the charging circuit 140 to charge the battery 150 and the power received from the power adapter 300 can also be provided to the computer device.

Note that, in the embodiment, when the power input circuit 100/200 receives power in both the wired and the wireless manners, the system takes the wired power source as the main power source. Therefore, in this scenario, the control of the switches SW1~SW5 or the transistors Q1~Q5 is the same as the scenario wherein the power input circuit 100/200 detects that only the power adapter 300 is plugged in. In this manner, when the power input circuit 100/200 detects that the power adapter 300 is plugged in and the wireless power receiver 110 receives power at the same time, the equivalent circuit of the power input circuit is the same as the one shown in FIG. 5. That is, the power received from the power adapter 300 is provided to the computer device as the flow of current I2 shown in FIG. 5, and the power received from the power adapter 300 is also provided to the charging circuit 140 to charge the battery 150 as the flow of current I3 shown in FIG. 5. In other words, in this scenario, the power provided by the wireless power source may not be used.

As discussed above, in the embodiment of the invention, when the system receives only the wireless power, stable power can be provided to the computer device via the large capacitor of the battery 150, and the battery 150 can be charged by the power received by the wireless power receiver 110. In this manner, even in cases where only the wireless power receiver 110 receives power, stable power can also be provided to the computer device. In addition, the disadvantage of slow response to changes in the loading of the computer system can be overcome. Therefore, the computer can operate stably no matter whether the loading is heavy or light and the problem discussed above can be solved.

The embodiments of the present invention can be implemented in any of numerous ways. For example, the embodiments may be implemented using hardware, software or a combination thereof. It should be appreciated that any component or collection of components that perform the functions described above can be generically considered as one or more processors that control the function discussed above. The one or more processors can be implemented in numerous ways, such as with dedicated hardware, or with general-purpose hardware that is programmed using microcode or software to perform the functions recited above.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A power input circuit, comprising:
   a wireless power receiver, receiving power from a wireless power transmitter;
   a battery;
   a charging circuit, coupled to the battery;
   a first switch, controlled by a first control signal;
   a second switch, coupled between the first switch and a voltage input terminal of a computer device and controlled by the first control signal;
   a third switch, coupled between the battery and the voltage input terminal and controlled by a second control signal;
   a fourth switch, coupled between the voltage input terminal and the charging circuit and controlled by a third control signal; and
   a fifth switch, coupled between the wireless power receiver and the charging circuit and controlled by a fourth control signal,
   wherein when the wireless power receiver receives the power, the third switch and the fifth switch are closed to transmit the received power to the charging circuit for charging the battery, and the computer device is powered by the battery.

2. The power input circuit as claimed in claim 1, further comprising:
   an adapter detection device, detecting whether a power adapter is coupled to the computer device and outputting a first detection signal according to the detection result,
   wherein when the adapter detection device detects that the power adapter is coupled to the computer device, the first switch and the second switch are closed, and the computer device is powered by the power adapter.

3. The power input circuit as claimed in claim 2, wherein when the wireless power receiver receives the power and the power adapter is not coupled to the computer device, the first switch, the second switch and the fourth switch are opened.

4. The power input circuit as claimed in claim 2, wherein when the wireless power receiver receives the power and the power adapter is coupled to the computer device to provide power, the first switch, the second switch and the fourth switch are closed and the third switch and the fifth switch are opened to transmit the power received from the power adapter to the charging circuit to charge the battery, and the computer device is powered by the power adapter.

5. The power input circuit as claimed in claim 2, further comprising:
a wireless power detection device, coupled to the wireless power receiver, detecting whether the wireless power receiver receives the power and outputs a second detection signal according to the detection result.

6. The power input circuit as claimed in claim 5, further comprising:
a control circuit, receiving the first detection signal and the second detection signal and generating the first control signal, the second control signal, the third control signal, and the fourth control signal according to the first detection signal and the second detection signal.

7. The power input circuit as claimed in claim 2, wherein the first switch, the second switch, the third switch, the fourth switch and the fifth switch are transistors, and wherein each transistor comprises a control electrode receiving a corresponding control signal.

8. The power input circuit as claimed in claim 1, wherein the wireless power receiver receives the power from the wireless power transmitter by magnetic induction or magnetic resonance.

9. The power input circuit as claimed in claim 1, wherein when the wireless power receiver does not receive the power and the power adapter is not coupled to the computer device, the first switch, the second switch and the fifth switch are opened and the third switch and the fourth switch are closed, and the computer device is powered by the battery.

10. The power input circuit as claimed in claim 1, wherein when the wireless power receiver does not receive power and the power adapter is coupled to the computer device, the first switch, the second switch and the fourth switch are closed and the third switch and the fifth switch are opened to transmit the power received from the power adapter to the charging circuit to charge the battery, and the computer device is powered by the power adapter.

* * * * *